United States Patent
Hopkins, III

(10) Patent No.: US 8,229,769 B1
(45) Date of Patent: Jul. 24, 2012

(54) SYSTEMS AND METHODS FOR PROCESSING OVERHEAD IMAGERY

(75) Inventor: John Chandler Hopkins, III, San Antonio, TX (US)

(73) Assignee: United Services Automobile Association, San Antiono, TX (US)

( * ) Notice: Subject to any disclaimer, the term of this patent is extended or adjusted under 35 U.S.C. 154(b) by 740 days.

(21) Appl. No.: 11/762,713

(22) Filed: Jun. 13, 2007

(51) Int. Cl.
*G06Q 40/00* (2012.01)
(52) U.S. Cl. ............ 705/4; 382/100; 705/1.1; 705/7.28; 705/35; 705/36 R
(58) Field of Classification Search .................. 705/4
See application file for complete search history.

(56) References Cited

U.S. PATENT DOCUMENTS

| | | | |
|---|---|---|---|
| 5,351,311 A | 9/1994 | Rogers et al. | |
| 5,897,619 A * | 4/1999 | Hargrove et al. | 705/4 |
| 6,118,885 A * | 9/2000 | Wadsworth et al. | 382/100 |
| 6,281,970 B1 | 8/2001 | Williams et al. | |
| 7,502,490 B2 * | 3/2009 | Rhoads et al. | 382/100 |
| 2002/0095317 A1 * | 7/2002 | McCabe | 705/4 |
| 2002/0120475 A1 | 8/2002 | Morimoto | |
| 2003/0093304 A1 | 5/2003 | Keller et al. | |
| 2003/0210168 A1 | 11/2003 | Ruszkowski, Jr. | |
| 2004/0186753 A1 * | 9/2004 | Kim et al. | 705/4 |
| 2005/0267837 A1 * | 12/2005 | White | 705/38 |
| 2006/0218018 A1 | 9/2006 | Schmitt | |
| 2009/0138290 A1 | 5/2009 | Holden | |

OTHER PUBLICATIONS

"U.S. Insurance Firms Have Eyes in the Sky," Sault Star (Sep. 27, 2004), p. A.1.Fro.*
Allen, Katie. "Weather: No Business Like Snow Business: Katie Allen Looks at Why Farmers and Stock Exchanges are Prepared to Pay Big Money for the Most Accurate Forecasts," The Guardian (May 21, 2007), p. 2.*
Seol, Kap Su. "Interest Grows in Securitizing Life Policies," National Underwriter (Nov. 5, 2001), p. 45.*
Cummins, David J.: Lalonde, David; Phillips, Richard D. "The Basis Risk of Catastrophic-Loss Index Securities," The Wharton Financial Institutions Center (May 24, 2000).*
Polstein, Peter M. "What To Do About Catastrophic Loss: Cats and Other Felines." (http://www.irmi.com/expert/articles/2006/polstein01.aspx) (Jan. 2006).*
"Satellite Images Used to Detect Crop Insurance Fraud", [online]. Jan. 12, 2006, Insurance Journal. [retrieved on Jun. 13, 2007]. Retrieved from the Internet: <URL: http://www.insurancejournal.com/news/midwestJ2006/01/12/64117.htm>, 3 pgs.

(Continued)

*Primary Examiner* — Elizabeth Rosen
(74) *Attorney, Agent, or Firm* — Kilpatrick Townsend & Stockton LLP

(57) ABSTRACT

Systems and methods to process overhead imagery received from overhead image sources are described herein. In one example, the method may include receiving an overhead image, detecting features on a property and deriving business information using the features. In another example, the system may include an overhead imagery module to positionally correlate images and an image analyzer to determine one or more features on a property. In a further example, the method may include receiving an overhead image, correlating the image with land maps, parsing individual properties, determining the property's values and aggregating the values across the image to derive a risk.

21 Claims, 9 Drawing Sheets

OTHER PUBLICATIONS

"UW Students Research Satellite Imagery to Map Northwest Tree Fruit and Grapes", [online]. Jul. 31, 2006, published by Washington Wide Industry Foundation. Retrieved from the Internet: <URL: http://www.washingtonwinefoundation.org/index.php?page_id=12& newsletter_id=32>, 3 pgs.

Botts, H., "Computer Modeling Tames Super-Cat Hurricane Risk", *White Paper, Proxix Solutions, Inc.*, (2007), 12 pgs.

Clifton, C., "Privacy, Security, and Data Mining—How Do We Mine Data When We Can't Even Look At It?", *ECML/PKDD-2002 Tutorial*, (Aug. 20, 2002, Helsinki, Finland), (2002), 56 pgs.

Ribarsky, W., et al., "From Urban Terrain Models to Visible Cities", *IEEE Computer Graphics and Applications*, (Jul./Aug. 2002), 2-7.

Roeder, L. W., et al., "The Global Disaster Information Network", [online]. Oct./Nov. 1999, *Bulletin of the American Society for Information Science*, vol. 26(1), [retrieved on Jun. 13, 2007]. Retrieved from the Internet: <URL: http://www.asis.org/Bulletin/Oct-99/roeder.html>, 5 pgs.

Garrett, "Rain Stops Foul Play by Claimants Bright Outlook for Insurers as Met Offers Data, writes Alex Garrett," The Observer, May 12, 1996, p. 9.

\* cited by examiner

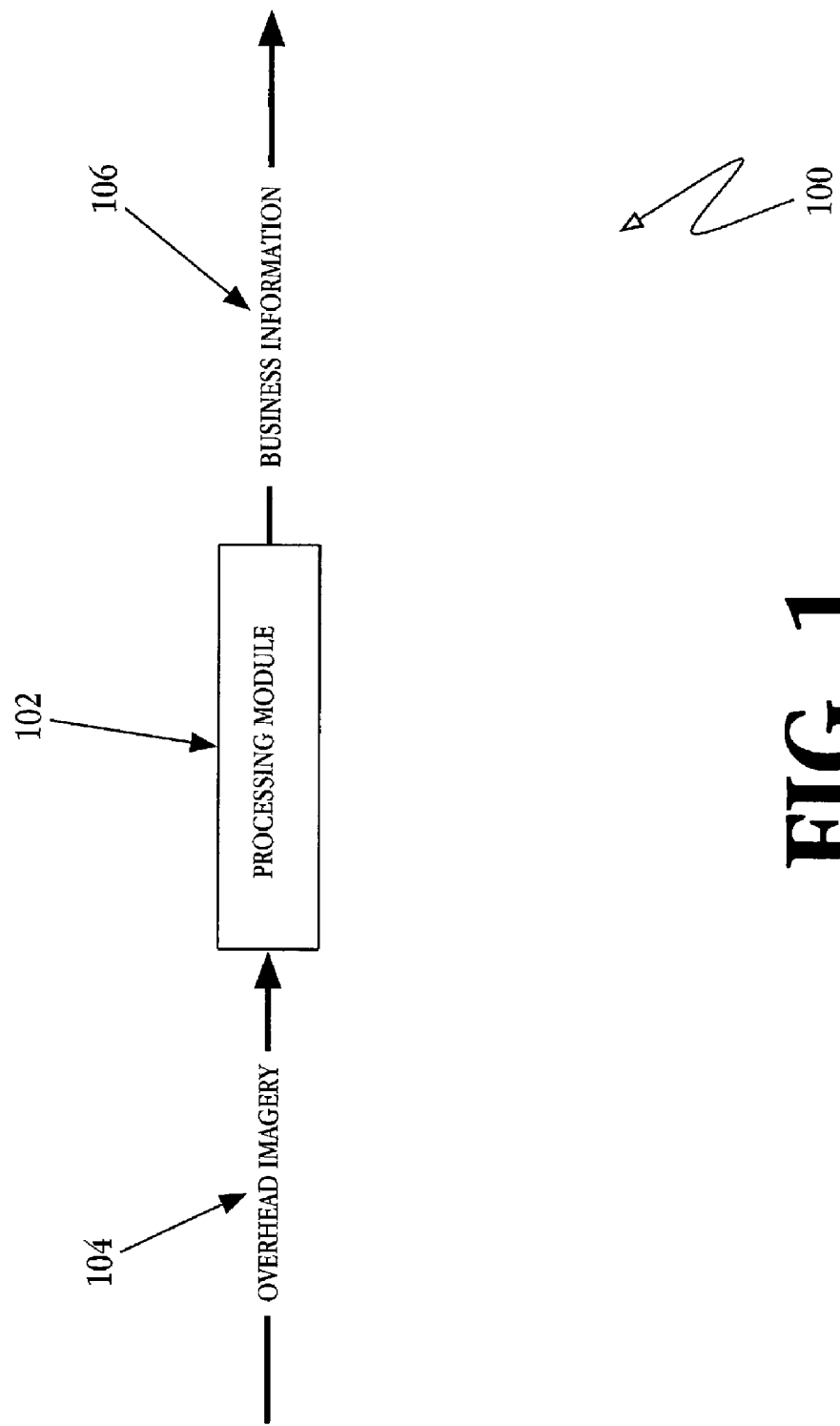

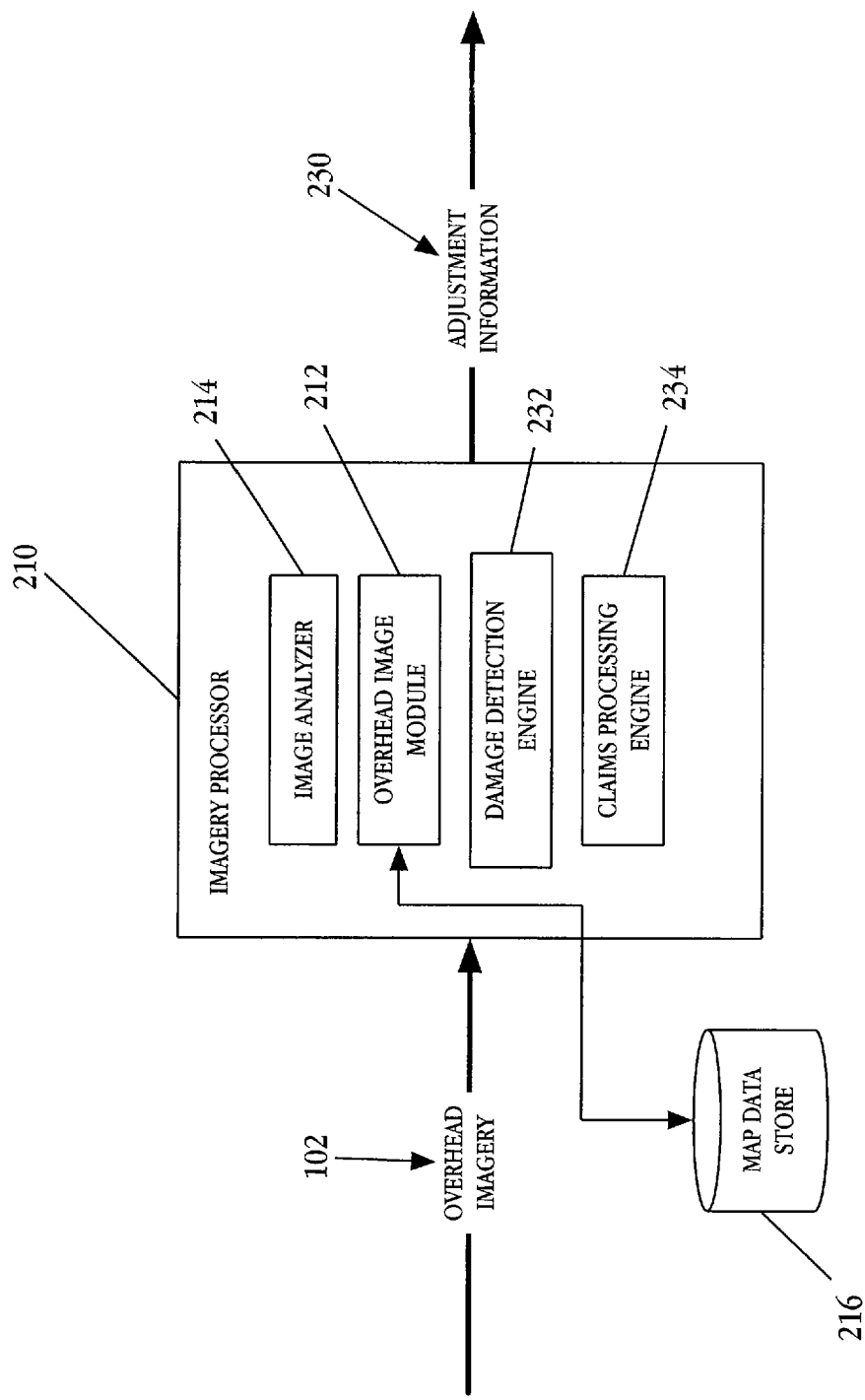

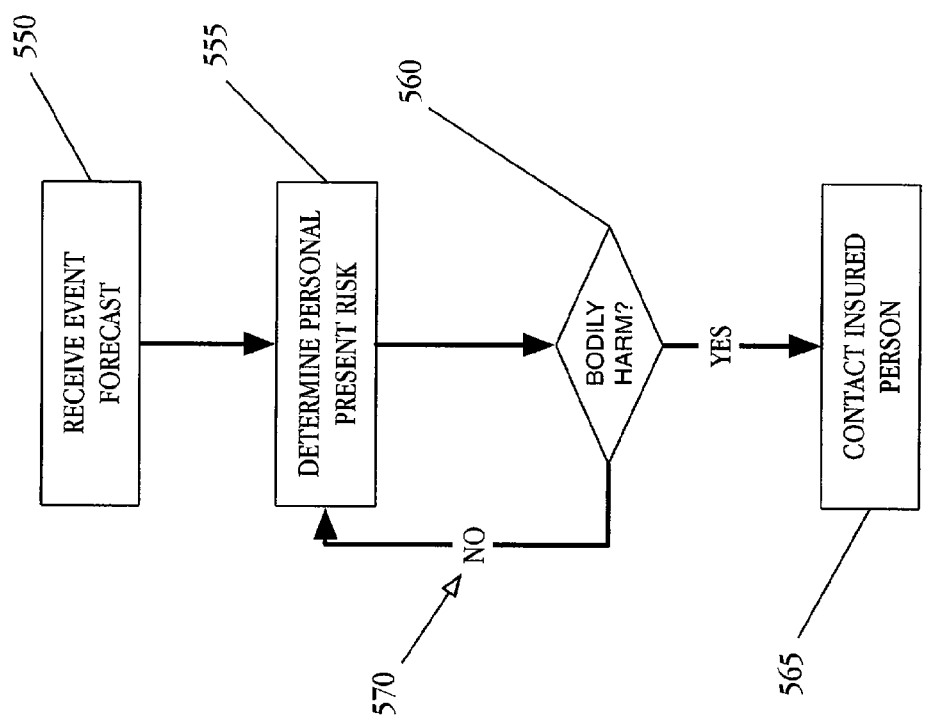

SYSTEMS AND METHODS FOR PROCESSING OVERHEAD IMAGERY

RELATED APPLICATIONS

This disclosure is related to pending U.S. patent application Ser. No. 11/762,707 filed Jun. 13, 2007, titled "SYSTEMS AND METHODS FOR PROCESSING OVERHEAD IMAGERY," and pending U.S. patent application Ser. No. 11/762,710 filed Jun. 13, 2007, titled "SYSTEMS AND METHODS FOR PROCESSING OVERHEAD IMAGERY," filed on an even date herewith.

TECHNICAL FIELD

This application relates to systems and methods that receive and process overhead imagery and more particularly to systems and methods that receive and process overhead imagery as an input to risk assessment systems.

BACKGROUND

Customers demand more of the products and services they use than ever before. They insist that the companies they deal with on a regular basis provide them greater and greater levels of accuracy and more tailored service offerings. Companies configure and operate ever increasing numbers of computer systems to achieve this.

Using sources of information that have traditionally been unavailable when service these customers is now expected. For instance, telemetry data from vehicles operated by a customer could be used to derive a risk that the customer presents in their auto insurance policy. In this manner, the policy could be tailored to an individual and not generalized over a grouping of customers.

SUMMARY

In an embodiment, a method of processing overhead imagery includes receiving one or more overhead images from at least one image source, detecting one or more features on a property, deriving business information using the one or more features and providing the business information. In a further embodiment, the business information may be used for either determining premiums for an insurance policy on the property, or for adjusting an insurance claim to compensate for damage experienced on the property. In another embodiment, a method of processing overhead imagery includes receiving one or more overhead images which contain a number of properties, correlating the one or more images with one or more land maps, parsing the properties into collections of individual properties, determining values for each of the properties and aggregating the values. In a further embodiment, a weather event footprint may be forecast and investment decisions made using the aggregated values. In another embodiment, an apparatus to process overhead imagery includes an overhead image module to receive and positionally correlate overhead images, and an image analyzer to determine one or more features on a property. In further embodiments, the one or more features may include risks to a structure on the property, or structural damage to a structure on the property.

BRIEF DESCRIPTION OF DRAWINGS

Embodiments are illustrated by way of example and not limitation in the figures of the accompanying drawings, in which like references indicate similar elements and in which:

FIG. 1 shows a high-level block diagram of a system for processing overhead imagery, in accordance with an example embodiment;

FIG. 2C shows a block diagram of an apparatus for processing and using information obtained from analyzed images, in accordance with an example embodiment;

FIG. 5B shows a flowchart of a method of providing individualized threat analysis, in accordance with an example embodiment.

DETAILED DESCRIPTION

Figure 2A:
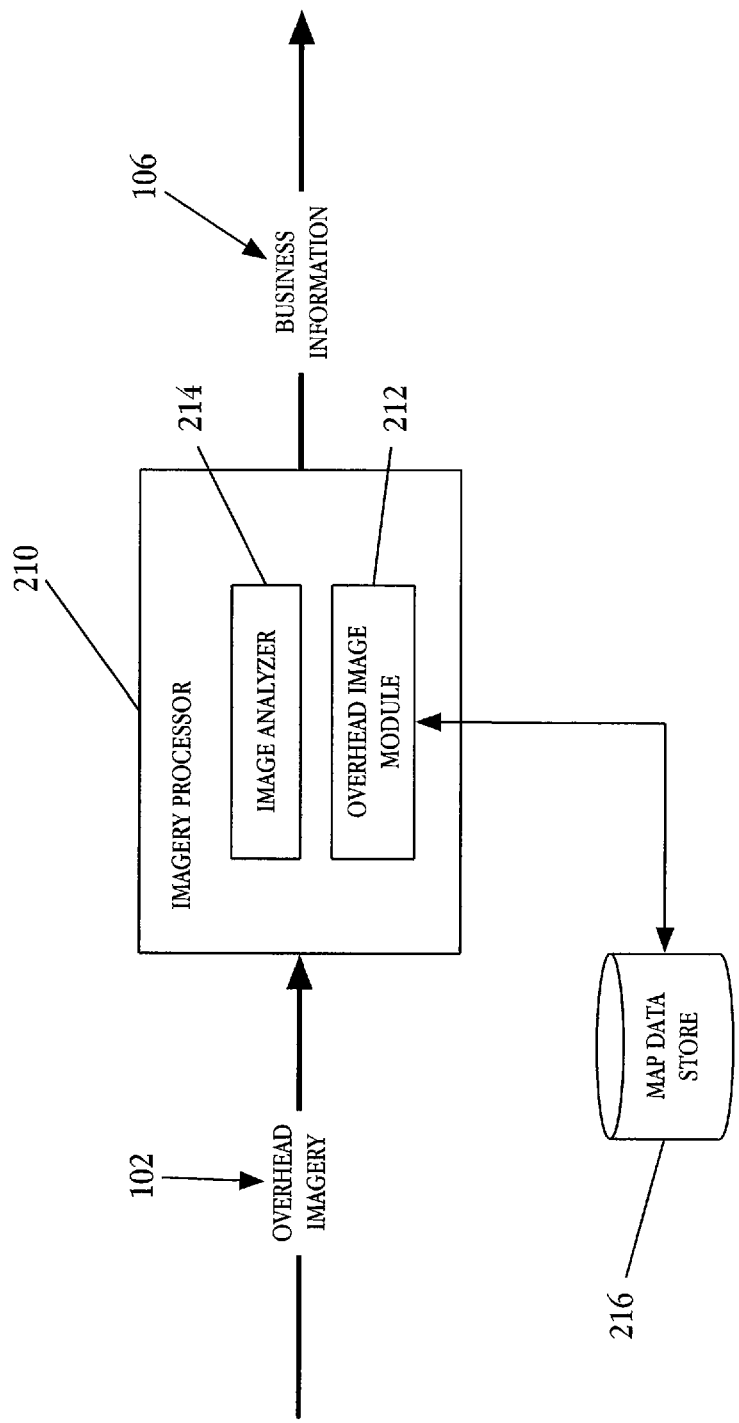
FIG. 2A shows a more detailed block diagram of an apparatus for processing and analyzing images, in accordance with an example embodiment.

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

FIG. 1 shows a high-level block diagram of a system for processing overhead imagery, in accordance with an example embodiment. The system 100 includes one or more processing modules 102 which receive overhead imagery 104. Following one or more operations performed by the processing modules 102, business information 106 is output. The business information 106 may include, without limitation, insurance underwriting data or claim adjustment data.

In an embodiment, the processing modules 102 are operated when a consumer requests an insurance policy, which may include, in one example, a property insurance policy. The insurance policy is a contract between the consumer and an insurance company where the consumer agrees to pay a prearranged periodic premium, and the insurance company agrees to reimburse the consumer for a partial or total loss of the property. For instance, a homeowner's policy provides the consumer piece of mind that they will be able to rebuild their home in the event of a catastrophic loss. The insurance company attempts to in the setting of the periodic premium to strike a balance between a competitive price and the amount of money needed to cover the potential loss. This is done over the aggregate of customers. If a premium is too high, it may drive away potential customers. If the premium is too low, the company may not be able to cover all of the losses in a year, possibly leading to bankruptcy. The premium for a specific consumer is a measure of the risk that some loss may occur on that property over the life of the policy.

Any number of information sources may be used to determine that risk and may include, without limitation, structure value, value of contents within the house, proximity to natural hazards (such as waterways), presence of physical hazards to people (such as a swimming pool), personal consumer risk (as measured by a credit score, in some examples, which can provide some measure of the fraud risk presented by the consumer) and the like. Typically, when quoting an insurance policy, however, a visit to the property itself is never made by the representative of the insurance company. This may lead to not factoring in any variety of other information that could lead to an increased or decreased risk to the property. One example of such information is the presence of large trees in close physical proximity to the structure. These trees, if felled during a storm, could destroy the entire house, or at least do damage to the homes. Other information may include proximity to a well traveled road. The system 100 described here can use, in one example, information obtained from overhead imagery to ascertain one or more risks to the property and provide that information to an underwriting engine.

In another embodiment, the processing modules 102 are operated when damage to an insured property occurs. This may be following a representation from the insured that damage has occurred to the property. Alternatively, the system 100 may be used following a weather event, such as a hail storm, or flood, though the present application has equal applicability to any event that may cause damage to a structure. In such an arrangement, the operations would occur without consumer initiation. For instance, the insurance company receives some indication of an event that possibly caused damage to insured properties. The processing modules 102 would be operated using overhead imagery of the insured property to determine if damage had occurred to the insured property. If damage had occurred, the insured could be contacted, or the information stored without contacting the insured.

As used herein, overhead imagery includes any images that were generated from an overhead source. This may include images received from a satellite, or an aircraft. In the latter example, the aircraft may be manned or unmanned. In either arrangement, the images may include visual as well as non-visual information. For instance, portions of the electromagnetic spectrum may yield information about structural damage which are not discernable visually, such as measuring the light absorption of a particular roof to determine if the roof has had hail damage. Other possible risks to the insured property may be shown by ground penetrating radar, such as sinkholes in proximity to the property. The images received may be passive images, or may be active images. One example of an active image, is a radar scan of the ground or property.

Systems

FIG. 2A shows a more detailed block diagram of an apparatus for processing and analyzing images, in accordance with an example embodiment. The imagery processor 210 includes an overhead image module 212 and an image analyzer 214. The imagery processor 210 receives overhead imagery 102 from one or more image sources, which may include overhead a plurality of overhead images. The image sources may include, as stated above, satellites or aircraft. The imagery processor outputs business information 106 as discussed above. The overhead image module 212 may be additionally coupled to a map data store.

In an embodiment, the overhead image module 212 is configured to receive images from the one or more overhead image sources and to positionally correlate the images. Positionally correlate includes defining the location of the images in a 3-dimensional space, such as latitude, longitude and elevation. The positionally correlated images can be associated with a property at that location. Positionally correlate may include receiving images from a source with an inconsistent path and combining those images with images received from a source with a more consistent path. One example of this are aircraft sources. Aircraft may have their position altered by air turbulence, or other means. This creates inconsistency when determining the exact locations of the images with respect to properties within them. However, aircraft flown over an area have an advantage over satellites in that the aircraft may have sensor packages that can be exchanged quickly, such as exchanging a camera that only operates in the visible spectrum for one that operates in the non-visible spectrum, such as infrared. To compensate for the possible inconsistency of an aircraft source, the images can be correlated with satellite imagery which is traditionally more accurate. However, other methods of correlating the images received may be used, such as through human image analysis, or through electronic means. This may be done by locating specific landmarks in the received image and correlating the image thereby.

In a further embodiment, the overhead image module 212 utilizes a map data store 216 to positionally correlate the images. This may be done through any suitable means, though one example of such use may include accurately locating landmarks in an area that can be readily identified in a received image. This could include physical landmarks, such as rivers, shorelines, mountain peaks, and the like. It could also include man-made landmarks such as distinctive buildings, roads, bridges, and the like.

In an embodiment, the image analyzer 214 is configured to receive the correlated images and to determine one or more features on the property using the correlated images. These features may include structures on the property, risks to the structures on the property, substructures of the structures on the property (such as roof, chimneys, garages, additions, and the like), or landscaping on the property (including recreational features such as a swimming pool, fencing, and the like). These are just some examples of features on a property and is not meant to be an exhaustive list. Any discernible feature on a property that could be used to value the property, determine a risk to structures, or determine incurred damage to the property are considered to be within the scope of the present discussion.

Figure 2B:
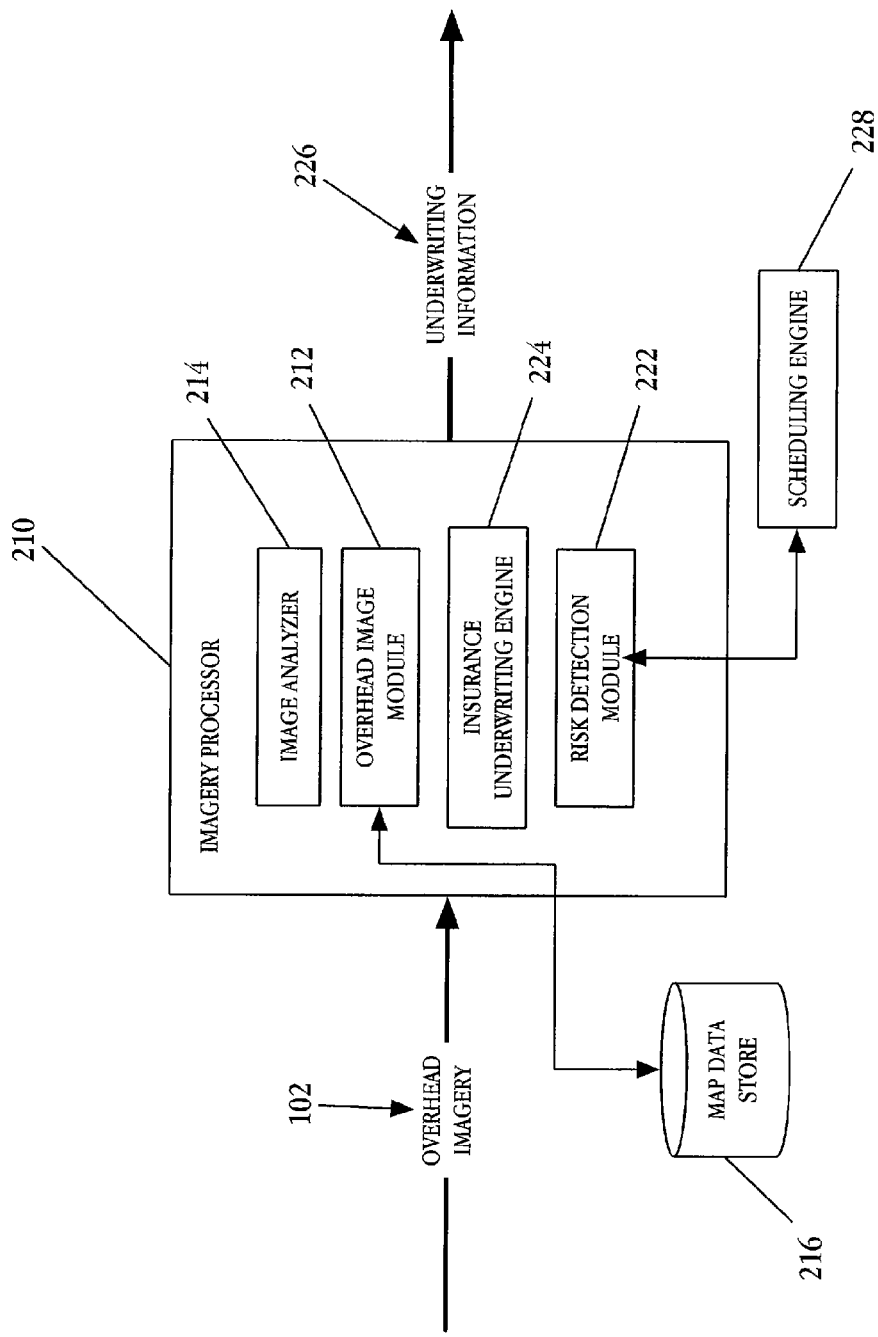
FIG. 2B shows a block diagram of an apparatus for processing and using information obtained from analyzed images, in accordance with an example embodiment.

FIG. 2B shows a block diagram of an apparatus for processing and using information obtained from analyzed images, in accordance with an example embodiment. The imagery processor 210 discussed above receives overhead imagery 104 and outputs business information 106 after performing one or more operations as discussed herein. One aspect of business information may be insurance underwriting information 220. In such an example, the imagery processor 210 may additionally include a risk detection engine 222 and an insurance underwriting engine 224.

In an embodiment, the risk detection engine 222 is configured to detect one or more risks to a structure on the property. As discussed above, risks to a structure are just one aspect of features that are determined by the image analyzer.

In an embodiment, the insurance underwriting engine 224 is configured to derive an insurance premium for a property using at least one or more risks to the property. These one or more risks may be received from the risk detection engine. Additional risks associated with the property may be supplied to the insurance underwriting engine 224 by an agent. The insurance underwriting engine 224 may, by using additional information and systems, quote the insurance policy. Alternatively, the insurance underwriting engine 224, as discussed above can supply the derived premium to other systems for final underwriting of a property insurance policy. In either case, the output of the apparatus shown in FIG. 2B is collectively known as underwriting information 226 and may include information fully suitable to underwriting an insurance policy, or merely a premium for the insurance policy given the risks to the property.

In a further embodiment, the apparatus may additionally include a scheduling engine 228 coupled to the risk detection engine 222 that is configured to periodically send instructions to the risk detection engine 222 that cause the risk detection engine 222 to perform operations to determine additional risks. These operations occur without being initiated by an insured or potential insured party. Through these operations, changes to the property can be ascertained and the policy quoted properly. This may include determining risks that did not exist when the policy was first quoted, or during the last risk detection operation. This risk detection operation may be performed periodically, but can be performed whenever needed, such as after a large weather event that may have felled trees in proximity to the property, or notification that a major highway is to be constructed adjacent to an insured property.

FIG. 2C shows a block diagram of an apparatus for processing and using information obtained from analyzed images, in accordance with an example embodiment. The imagery processor 210 discussed above receives overhead imagery 104 and outputs business information 106 after performing one or more operations as discussed herein. One aspect of business information may be adjustment information 230. As used herein, adjustment information includes any information that can be used to determine the amount of damage to an insured property or to a insured structure. One example of this may be the amount required to complete a full repair of a roof after a hail storm. In these examples, the imagery processor includes the overhead image module 212 and the image analyzer 214 as discussed above with respect to FIG. 2A. The imagery processor additionally includes, in this example, a damage detection module 232 and a claims processing engine 234.

In an embodiment, the damage detection module is configured to detect structural damage using the received images using either visual, non-visual information, or both. This can be done through any suitable means intended to detect a change in the structural composition of the insured property. This may include a difference in the light absorption in a roof (possibly indicative of damage to the roof), in one example. Any number of image analysis techniques may be used to detect damage. One aspect of detecting damage may also include comparing baseline images (such as taken when the property was first insured, or some time prior to a potentially damaging event) to a current image and noting the differences between the two. Any difference could be considered damage to the property.

In an embodiment, the claims processing engine 234 takes the structural damage detected by the damage detection engine 232 and uses that information to process an insurance claim. This may include quantifying the damage and determining the maximum amount of coverage given the policy insuring the property. It may additionally include sending instructions to a check processing unit (not shown in FIG. 3C) so that a check, or other monetary device, can be issued to the insured to repair, or cover, the damage. In these example, the claims processing engine 234 may operate without the intervention of a claims processing agent. Alternatively, the claims processing engine may process an insurance claim by making a preliminary determination as to the amount of damage to the structure and provide that information to a claims processing agent. The claims processing agent, in this example, can then perform other operations directed towards the satisfaction of that insurance claim. This may be advantageous in situations where only one aspect of damage to a property is ascertainable to the image analyzer. In either case, the imagery processor in this example outputs adjustment information that can be used for the satisfaction of an insurance claim made by the insured.

In an alternate embodiment, the apparatus depicted in FIG. 2C can be used without initiation by the insured or a claims processing agent. One example of this is following a large weather event, such as a hail storm, tornado, or hurricane. The operator of the apparatus could choose to dispatch image sources to the affected area and preliminarily determine damage to insured properties in that area. Claims processing agents can then begin to contact the insured and work with them to resolve the potential insurance claim. Alternatively, the information can be stored and retrieved when the insured calls a claims processing agent, which can lead to a quicker resolution to the problem, as the agent is already preliminarily apprised of the situation. As the operator of the apparatus is dispatching resources to the area to determine damage to properties insured by them, or a company hiring the operator, other uses of the overhead imagery and damage information can be made. One example of this is future marketing information where the operator notes properties with large damage amounts and targets future marketing towards them. Another possible use is input into an investment decision engine to determine the potential financial liability to company providing insurance to properties in the area.

Methods

Figure 3:
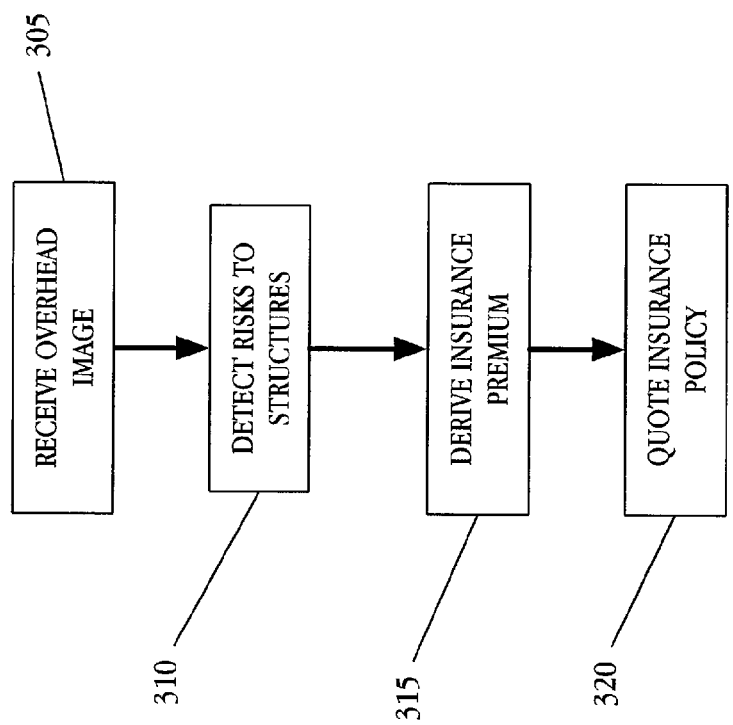
FIG. 3 shows a flowchart of a method for determining risk, in accordance with an example embodiment.

FIG. 3 shows a flowchart of a method for determining risk, in accordance with an example embodiment. In an embodiment, the operations depicted in FIG. 3 are carried out by an apparatus such as that depicted above in FIG. 2B.

At block 305, an overhead image is received. This may be from any number of overhead image sources, such as aircraft or satellite. Either of those sources may be in constant operation or may be dispatched specifically for the purpose of determining risks to structures on the property. As discussed above, the proper determination of a premium for an insurance policy requires an accurate determination of the risk to the structure on the property. Too much erroneous risk, and the insurance company may drive the potential customer away with a higher premium. An erroneous lack of risk may result in a situation where the insurance company loses money, as it would not have enough money to cover potential losses. Risks to an insured property are varied and may include physical risks, such as a tree falling on the house, presence of a swimming pool without adequate barriers, proximity of a well-traveled roadway, and the like. The risks may also be non-physical, such as the propensity of the insured to not pay their premiums, the propensity of the insured to submit fraudulent claims, and the like. The aggregate of that risk information is used to properly derive an insurance premium. The discussion herein relates specifically to physical risks that are ascertainable through image analysis, but which may be used in conjunction with information about non-physical risks.

At block 310, risks to the structure are detected. Risks are just one type of feature on a property, and as discussed below, may include damage. At block 315 an insurance premium is derived using those risks. Additional information may be used at block 315, such as the non-physical risks. It may also include information about the relative worth of the home, such as determined by public records. Public records, for instance, typically maintain an assessed value for the purposes of proper taxation. This information is publicly available and may be queried without initiation by the potential insured. Alternatively, the potential insured may supply that information to the system, or to an agent.

At block 320, the insurance policy is quoted. This may be without agent interaction, such as solely through a computer interface, which may include a web-enabled online form operable on a computing device operated by the user. Alternatively, such an interaction may be augmented by an interaction with an agent. In one embodiment, the premium is derived at block 315 by automated systems, and the policy is quoted at block 320 by a human agent. Either scenario is equally applicable, though some insurance underwriters may prefer an agent to be involved with the interaction. One determining factor in deciding whether to quote the insurance policy without an agent is the value of the property. For example, if an insured property has a value below a certain threshold, such as $200,000, an agent is not needed, but in cases where the property value exceeds the threshold, the agent's interaction is required.

Figure 4:
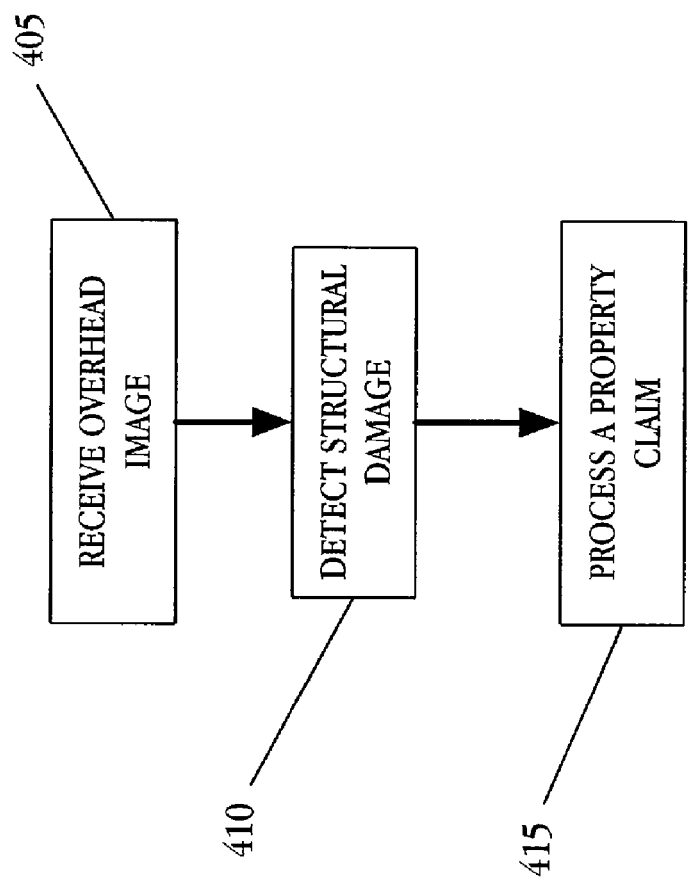
FIG. 4 shows a flowchart of a method of claim adjustment, in accordance with an example embodiment.

FIG. 4 shows a flowchart of a method of claim adjustment, in accordance with an example embodiment. In an embodiment, the operations depicted in FIG. 4 are carried out by an apparatus such as that depicted above in FIG. 2C.

The operations depicted in FIG. 4 are similar to those described above with respect to FIG. 3. In this example, however, the feature on the property of interest is damage to the structure and using that damage information to process an insurance claim. At block 405, one or more overhead images are received from an image source. The image sources may be fixed, but in cases of damage due to some event, such as a weather event, the image source may be dispatched following the event. This may be preferable in some situations as the costs of maintaining an overhead imager could be prohibitive. With respect to satellite's, it may be more cost effective to allocate time on the satellite when needed and not on a continuous basis. However, these are only example arrangements, that continuously operating overhead imagers may also be used.

At block 410, structural damage is detected. This may be done, in one example, by comparing a present image with a stored imaged and noting the difference. For instance, if a structure appears in the stored image and is absent in the present image, it can be inferred that the entire structure has been destroyed. This is an extreme example, but the principle remains the same for any number of damage determinations. The only difference is that in the extreme example, visual information alone could determine the extent of the damage. For less noticeable damages, non-visual information may be used. This may include images capturing the infrared portion of the electromagnetic spectrum. Additionally, penetrating radar may be used to test the integrity of the structure. These are just some examples, and the present application is not limited to any specific method, as any suitable method of image analysis, in either the visual or non-visual spectrum, can be performed to determine the difference between a present image and a stored image.

At block 410, a property claim is processed using at least the detected structural damage. In one embodiment, this may include determining the amount of damage, the amount of coverage, and issuing a check for the repair of the damage up to the covered amount. For example, if the insured has a policy that covers up to $15,000 in roof damage due to hail, and they experience $12,000 in damage, a check for $12,000 could be issued. This may be reduced by some deductible amount as set forth in their insurance policy. However, if the damage was $20,000, they would only receive a check for $15,000. The issuing of a check may be done without agent interaction, and solely by automated systems. However, it may also be done with agent interaction, or with some combination based on the amount of damage.

As discussed above, these operations may occur without the insured ever initiating them. In such an arrangement, the insurance company, or its associated entities, may note an event that may have caused property damage has occurred in an area. The operations depicted in FIG. 4 could be carried out with each of the properties insured. The property claim may be automatically issued, but could also be stored for further action. This may include an outbound call by a claims processing agent, or could include storing the claim and waiting for the insured to initiate some action.

Figure 5A:
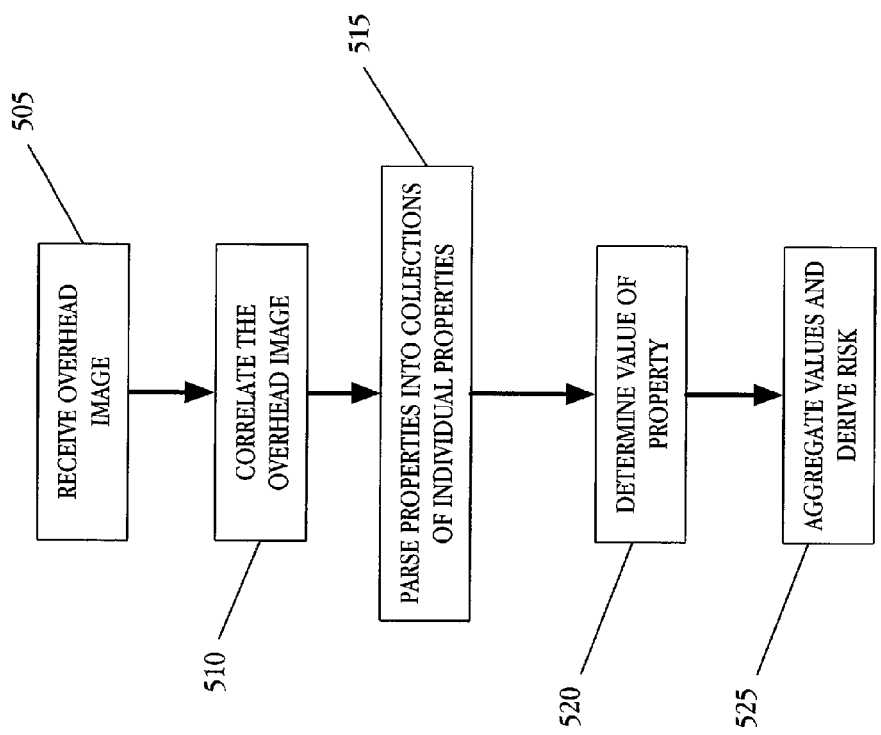
FIG. 5A shows a flowchart of a method of aggregating information for risk analysis, in accordance with an example embodiment.

FIG. 5A shows a flowchart of a method of aggregating information for risk analysis, in accordance with an example embodiment. The operations depicted in FIG. 5A may be carried out on apparatus depicted above in FIGS. 2A and 2B, in one example.

At block 505, overhead images are received into the system. The overhead images contain a plurality of properties, each of which may be insured by an insurance company. Some of the properties in the image may not be insured at all. In such case, for further operations, those properties having no insurance would be discarded from the set of properties. At block 510, the overhead images are correlated with one or more land maps. These land maps may include a plat map, which shows the divisions of a piece of land, specifically the individual properties in a specific area. Correlating the overhead images with a plat map, in one example, provides the ability to determine individual properties contained within the overhead image. The land maps may also include topographic maps (which can provide the risk to the structure of higher water levels) and street maps (which can provide information about how quickly an insured person can remove their belongings prior to the event).

The plurality of properties are parsed at block 515 into a collection of individual properties. The collection of individual properties comprises a subset of properties that carry property insurance underwritten by a single insurance company. Determining which insurance company insures a property may be carried out using public records or purchased lists. As each property that is insured may also carry a lien of some variety on it, the public records with respect to property liens may be used to determine which insurance company insures which property. The operation at block 510 is intended to create subsets of the plurality of properties, each of which represent the at least a portion of, but preferably the entirety of, the properties insured by a single insurance company. In instances where the insurance company for a particular property can not be determined, the property is categorized into the subset of uninsured properties.

At block 520, each of the properties in a subset of properties is examined as to value. As discussed above, a property has an assessed value for the purposes of taxation, which is a matter of public record. This value can then be used for further valuing operations. At block 525, the values of the properties within the subset of properties is aggregated. This represents the amount of insured liability carried by that insurance company for that area of land. In other words, this represents the total financial liability to the company in the event of a catastrophic loss in that area. In a large geographic sense, this can be used to ascertain the financial risk for a particular company in a region. More specifically, this information can also be used to forecast the potential liability to a particular company or collection of companies for an impending event.

In a further embodiment, the footprint of a weather event may be forecast. This may be through publicly available forecast models, such as promulgated by the National Oceanic and Atmospheric Association (NOAA), or through proprietary forecast models. The footprint of the weather event is a representation of the path of a storm through an area and may include areas of higher winds, or rain. Each of those represent larger risks to properties within the footprint of the weather event. The subset of properties identified above may be further reduced to only those properties within the footprint of the event. The aggregate of the values of those properties can be used to derive a potential risk for an insurance company. Investment decisions can then be made with regards to traded securities for that company. For example, if a category 5 hurricane is about to destroy an area and a company has a large number of properties in that area, it will have to cover those losses. The value of the company as it draws down on its liquid reserves will be lessened. It would bee advantageous to an investor to sell off securities prior to the loss. These operations provide that investor the ability to determine risks to individual companies due to weather.

In an alternate embodiment, the aggregate values may be aggregated across all of the properties in the image. Using those aggregated values, a risk multiplier may be derived and when future premiums are quoted for that area, the risk multiplier may be used. This may be used to show the relative value of all properties in the area and determining if the value of an individual property is out of a normal distribution, in one example.

The operations described above relate to securities associated with insurance companies. However, the operations have similar applicability to other companies and industries. By using aggregate over the entirety of a footprint of an event, the impact of the event on other companies could be measured. In one example, securities in construction related companies could be traded in anticipation of larger demand. Trading in commodities futures, such as farm product, could also benefit from a true representation of the impact of an impending weather event. For instance, operating on a weather forecast that predicts a weather cell will traverse a large citrus crop, a commodities trader may buy commodities in citrus as they are expecting a shortage. In all of these examples, the trader operating on this information would be able to trade earlier than a trader who does not have access to this information.

FIG. 5B shows a flowchart of a method of providing individualized threat analysis, in accordance with an example embodiment. The operations depicted in FIG. 5B may be carried out, in one embodiment, partly by systems described above with respect to FIG. 2A.

At block 550, an event forecast is received. This event may include, without limitation, a weather event, a terrorist event, an industrial accident, military invasion and the like. Each of these types of events presents differing hazards to an insured person in an area affected by them. Specific reference may be made herein to weather events, though the operations described herein have equal applicability to the other event types.

At block 555, a present risk to an insured person is determining using the forecast received at block 550 and risk information for the property in which the insured person resides. The risk information can be a representation of the damage that could occur during the event to the property. This damage may lead to bodily harm for the insured. This damage could be caused by high winds uprooting trees during a storm with those trees falling on the house. It may also include the risk to flooding, either from a river flooding, or a storm surge leading a hurricane. Non-weather events have unique damage possibilities, as well. For instance, a terrorist event may involve the release of a chemical agent, which could contaminate the air within a property. However, some properties may have specific systems installed that prevent unfiltered air from reaching the interior. The possible bodily harm to an individual would take such information into account. Combining specific information about the event (wind speed, and expected storm surge, for example), with specific information about the structure in which the insured resides (hurricane straps for the roof, composition of the walls, for example) results in a very targeted risk profile for the insured. By contrast, general warnings for a community preceding a large weather event, for example, do not take into account individuals. In the cases of catastrophic weather where emergency services are evacuated, this is slightly less useful, but in cases where individuals are advised to leave, a system like this which results in an individualized warning for an insured would provide more specific information to act on.

Reference has been made to weather events though the operations described here have equal applicability to any event that may impact an insured property. As discussed above, this may include a terrorist event, an industrial accident, a military invasion, and the like. Each of these events may present specific threats to a property and to an insured, but the overall operations are very similar. With respect to a terrorist event, which is very dynamic, forecasting the aftermath of the event would provide similar risk information to a weather event. Such aftermath may include, chemical plume following a release, radioactive plume, and the like. Similarly, industrial accidents and military invasions can be processed.

Figure 6:
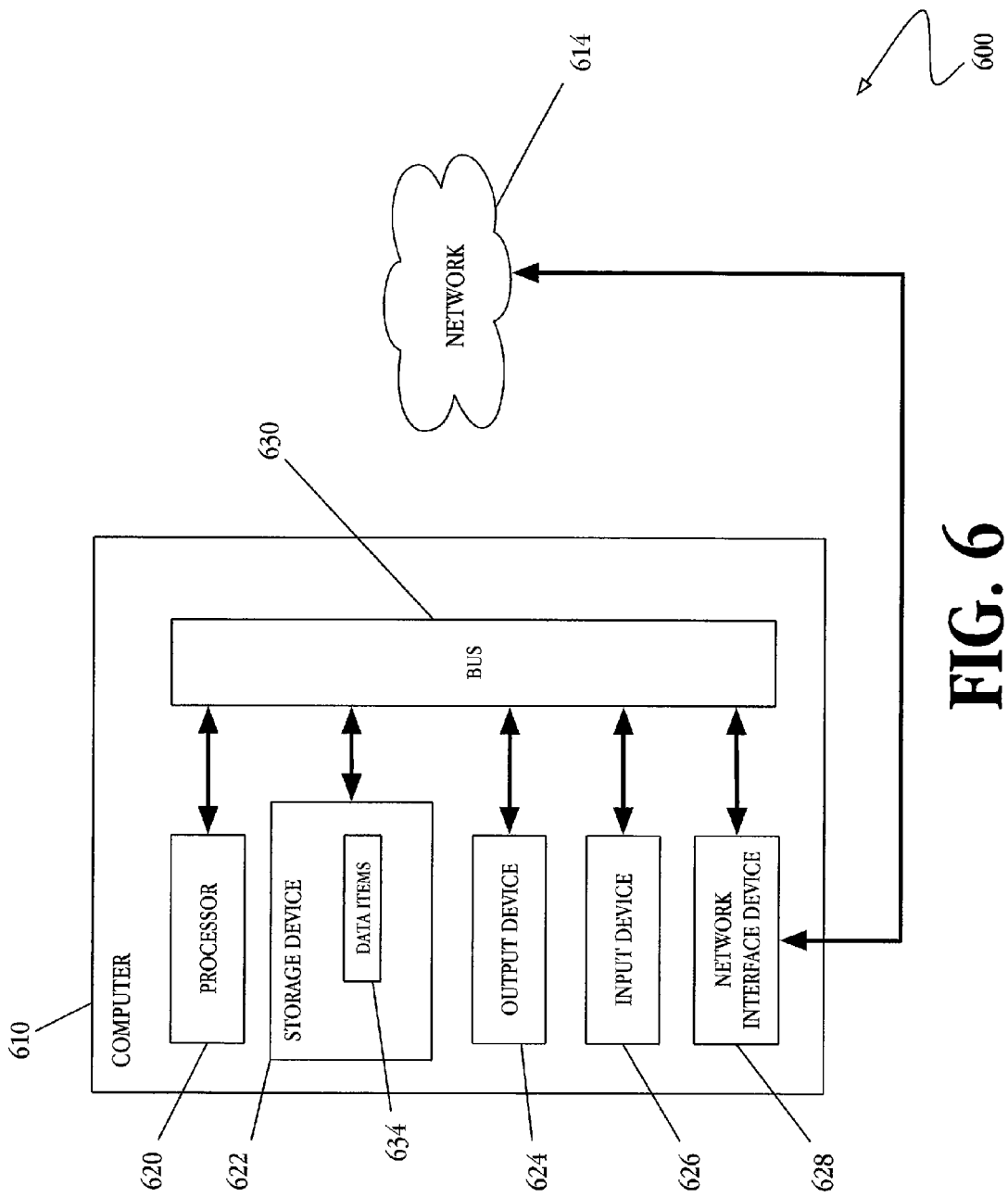
FIG. 6 shows a block diagram of a machine including instructions to perform any one or more of the methodologies described herein.

FIG. 6 shows a block diagram of a machine including instructions to perform any one or more of the methodologies described herein. A system 600 includes a computer 610 connected to a network 614. The computer 610 includes a processor 620, a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of processing overhead imagery, the method comprising:
  receiving, by a processor, one or more overhead images, the one or more overhead images containing a plurality of properties, each of which may carry a property insurance underwritten by an insurance company;
  correlating, by the processor, the one or more overhead images with one or more land maps;
  parsing, by the processor, the plurality of properties into collections of individual properties, the collections of individual properties comprising a subset of the plurality of properties, wherein each of the individual properties carry property insurance underwritten by a single insurance company;
  determining, by the processor, an assessed value for each of the individual properties in the subset of the plurality of properties; and
  aggregating, by the processor, the assessed values for the subset of the plurality of properties;
  deriving, by the processor, a risk of catastrophic loss for the single insurance company using the processor, wherein the risk of catastrophic loss uses the aggregated assessed value;
  receiving a forecast of a footprint of a weather event;
  reducing, by the processor, the subset of the plurality of properties to only properties within the footprint;
  deriving, by the processor, a potential risk for the single insurance company;
  determining, by the processor, an amount of securities in the single insurance company owned by an investor; and
  selling a portion of the amount of securities using the potential risk.

2. The method of claim, 1 wherein the forecast of the footprint of a weather event using at least one of the following: National Oceanic and Atmospheric Association (NOAA) forecast models or proprietary forecast models.

3. The method of claim 1, further comprising:
deriving, by the processor, a risk multiplier using the aggregated assessed values; and
quoting future insurance premiums for properties in the subset of the plurality of properties using the risk multiplier.

4. The method of claim 1, wherein determining values for each of the plurality of properties includes querying, by the processor, a publicly available database of property values and using the returned result for determining the assessed values for each of the individual properties.

5. The method of claim 1, wherein determining values for each of the plurality of properties includes querying, by the processor a proprietary database of property values maintained by the single insurance company and using the returned result for determining the assessed values for each of the individual properties.

6. The method of claim 1, wherein the one or more land maps includes at least one of the following: topographic maps, street maps, and plat maps.

7. The method of claim 1, wherein the property insurance comprises homeowner's insurance.

8. A non-transitory computer-readable medium comprising computer-readable instructions for processing overhead imagery, the computer-readable instructions being executed by a computer and comprising instructions to:
receive one or more overhead images, the one or more overhead images containing a plurality of properties, each of which may carry a property insurance underwritten by an insurance company;
correlate the one or more overhead images with one or more land maps;
parse the plurality of properties into collections of individual properties, the collections of individual properties comprising a subset of the plurality of properties, wherein each of the individual properties carry property insurance underwritten by a single insurance company;
determine an assessed value for each of the individual properties in the subset of the plurality of properties; and
aggregate the assessed values for the subset of the plurality of properties;
derive a risk of catastrophic loss for the single insurance company using the aggregated assessed value;
receive a forecast of a footprint of a weather event;
reduce the subset of the plurality of properties to only properties within the footprint and deriving a potential risk for the single insurance company;
determine an amount of securities in the single insurance company owned by an investor; and
sell a portion of the amount of securities using the potential risk.

9. The non-transitory computer readable medium of claim 8, wherein the forecast of the footprint of a weather event uses at least one of the following:
National Oceanic and Atmospheric Association (NOAA) forecast models or proprietary forecast models.

10. The non-transitory computer readable medium of claim 8, wherein the computer-readable instructions further comprise instructions to:
derive a risk multiplier using the aggregated assessed values; and
quote future insurance premiums for properties in the subset of the plurality of properties using the risk multiplier.

11. The non-transitory computer readable medium of claim 8, wherein determining values for each of the plurality of properties includes querying a publicly available database of property values and using the returned result for determining the assessed values for each of the individual properties.

12. The non-transitory computer readable medium of claim 8, wherein determining values for each of the plurality of properties includes querying a proprietary database of property values maintained by the single insurance company and using the returned result for determining the assessed values for each of the individual properties.

13. The non-transitory computer readable medium of claim 8, wherein the one or more land maps includes at least one of the following: topographic maps, street maps, and plat maps.

14. The non-transitory computer-readable medium of claim 8, wherein the property insurance comprises homeowner's insurance.

15. A system for processing overhead imagery, the system comprising:
a processor;
a database coupled to the processor; and
a computer-readable medium coupled to the processor and storing a plurality of instructions for controlling the processor to process the overhead imagery, the plurality of instructions comprising:
instructions that cause the processor to receive one or more overhead images, the one or more overhead images containing a plurality of properties, each of which may carry a property insurance underwritten by an insurance company;
instructions that cause the processor to correlate the one or more overhead images with one or more land maps parsing the plurality of properties into collections of individual properties, the collections of individual properties comprising a subset of the plurality of properties, wherein each of the individual properties carry property insurance underwritten by a single insurance company;
instructions that cause the processor to determine an assessed value for each of the individual properties in the subset of the plurality of properties;
instructions that cause the processor to aggregate the assessed values for the subset of the plurality of properties;
instructions that cause the processor to derive a risk of catastrophic loss for the single insurance company using the aggregated assessed value;
instructions that cause the processor to receive a forecast of a footprint of a weather event;
instructions that cause the processor to reduce the subset of the plurality of properties to only properties within the footprint;
instructions that cause the processor to derive a potential risk for the single insurance company;
instructions that cause the processor to determine an amount of securities in the single insurance company owned by an investor; and
instructions that cause the processor to sell a portion of the amount of securities using the potential risk.

16. The system of claim 15, wherein the forecast of the footprint of a weather event uses at least one of the following: National Oceanic and Atmospheric Association (NOAA) forecast models or proprietary forecast models.

17. The system of claim 15, wherein the plurality of instructions further comprise:

instructions that cause the processor to derive a risk multiplier using the aggregated assessed values; and instructions that cause the processor to quote future insurance premiums for properties in the subset of the plurality of properties using the risk multiplier.

18. The system of claim 15, wherein determining values for each of the plurality of properties includes querying a publicly available database of property values and using the returned result for determining the assessed values for each of the individual properties.

19. The system of claim 15, wherein determining values for each of the plurality of properties includes querying a proprietary database of property values maintained by the single insurance company and using the returned result for determining the assessed values for each of the individual properties.

20. The system of claim 15, wherein the one or more land maps includes at least one of the following: topographic maps, street maps, and plat maps.

21. The system of claim 15, wherein the property insurance comprises homeowner's insurance.

* * * * *